(12) United States Patent
Feigleson et al.

(10) Patent No.: US 9,045,984 B2
(45) Date of Patent: Jun. 2, 2015

(54) STATOR VANE MISTAKE PROOFING

(75) Inventors: Steven J. Feigleson, Falmouth, ME (US); Dennis R. Tremblay, Biddeford, ME (US)

(73) Assignee: United Technologies Corporation, Hartford, CT (US)

( * ) Notice: Subject to any disclaimer, the term of this patent is extended or adjusted under 35 U.S.C. 154(b) by 508 days.

(21) Appl. No.: 13/485,616

(22) Filed: May 31, 2012

(65) Prior Publication Data

US 2013/0323042 A1 Dec. 5, 2013

(51) Int. Cl.
*F01D 9/04* (2006.01)
*F01D 11/00* (2006.01)
*F01D 25/28* (2006.01)

(52) U.S. Cl.
CPC ........... *F01D 9/042* (2013.01); *Y10T 29/49323* (2015.01); *F01D 11/005* (2013.01); *F01D 25/285* (2013.01)

(58) Field of Classification Search
CPC ............ F01D 9/00; F01D 9/41; F01D 9/042; F01D 25/285; F01D 25/28; F01D 25/246; F01D 11/005; F04D 29/542
USPC ................ 415/119, 191, 208.1, 208.2, 209.2, 415/209.3, 209.4, 210.1
See application file for complete search history.

(56) References Cited

U.S. PATENT DOCUMENTS

| | | | |
|---|---|---|---|
| 5,131,814 A | 7/1992 | Przytulski et al. | |
| 5,584,654 A | 12/1996 | Schaefer et al. | |
| 6,220,815 B1 | 4/2001 | Rainous et al. | |
| 6,908,279 B2 | 6/2005 | Sullivan et al. | |
| 6,984,104 B2 | 1/2006 | Alexander et al. | |
| 7,448,848 B2 | 11/2008 | Alexander et al. | |
| 8,033,785 B2 | 10/2011 | Thermos et al. | |
| 8,047,778 B2 | 11/2011 | Kasperski et al. | |
| 2004/0109762 A1 | 6/2004 | Hidalgo et al. | |
| 2006/0188369 A1 | 8/2006 | Charier et al. | |
| 2007/0253809 A1 | 11/2007 | Glynn et al. | |
| 2008/0253882 A1 | 10/2008 | Major et al. | |
| 2009/0081046 A1 | 3/2009 | Mace et al. | |
| 2009/0252610 A1 | 10/2009 | Wassynger et al. | |
| 2009/0252611 A1 | 10/2009 | Tipton et al. | |
| 2010/0068049 A1 | 3/2010 | Thermos et al. | |
| 2010/0092278 A1 | 4/2010 | Major et al. | |

(Continued)

FOREIGN PATENT DOCUMENTS

| EP | 1108901 A1 | 6/2001 |
|---|---|---|
| EP | 1108901 A3 | 6/2001 |

(Continued)

OTHER PUBLICATIONS

International Search Report dated Mar. 10, 2014, for International Application No. PCT/US2013/043083.

*Primary Examiner* — Edward Look
*Assistant Examiner* — Christopher J Hargitt
(74) *Attorney, Agent, or Firm* — Kinney & Lange, P.A.

(57) ABSTRACT

An assembly for use in a gas turbine engine includes an inner diameter (ID) shroud having a plurality of ID slots and an outer diameter (OD) shroud having a plurality of OD slots. The OD shroud is positioned radially outward from the ID shroud. A first stator airfoil extends from the ID shroud to the OD shroud. The first stator airfoil is positioned at least partially in one of the ID slots and is positioned at least partially in one of the OD slots. A first end of the first stator airfoil has one of a raised tab and an indented notch.

20 Claims, 6 Drawing Sheets

(56) References Cited

U.S. PATENT DOCUMENTS

2010/0166545 A1* 7/2010 Schuler et al. .............. 415/189
2010/0172749 A1   7/2010 Mitsuhashi et al.
2010/0172755 A1* 7/2010 Kasperski et al. ........ 415/209.3
2011/0097206 A1   4/2011 Belmonte et al.

FOREIGN PATENT DOCUMENTS

| EP | 1108901 B1 | 5/2006 |
| EP | 2177771 A2 | 4/2010 |
| EP | 2204552 A2 | 7/2010 |

* cited by examiner

STATOR VANE MISTAKE PROOFING

CROSS-REFERENCE TO RELATED APPLICATION

Reference is made to application Ser. No. 13/485,628 entitled "Stator Vane Bumper Ring", which is filed on even date and are assigned to the same assignee as this application, the disclosure of which is incorporated by reference in its entirety.

BACKGROUND

The present invention relates to gas turbine engines, and in particular, to stator vanes for use in gas turbine engines. Gas turbine engines typically include one or more compressor stages as well as one or more turbine stages, each with rotating rotor blades and stationary stators. In some gas turbine engines, a stator assembly includes a stator airfoil extending between two shrouds.

Such stator airfoils typically include two ends, and can be connected at one or both ends. Such connections are typically rigid connections to hold the stator airfoils rigidly in place. Such rigid connections can cause the stator airfoils to experience high stresses at certain stress points, such as 12,000 psi (pounds per square inch) (82,737,087.5 pascals) or more. These high stresses can cause such stator airfoils to fail over time. Stator airfoils can be made with high performance materials in effort to withstand these stresses. However, such material can be undesirably expensive to manufacture and can also be relatively heavy, adding undesirable weight to the gas turbine engine.

Stator airfoils can have specific shapes designed for use in a particular stage or at a particular location in a particular stage. If a stator airfoil is attached at an incorrect location, it can negatively affect performance of the gas turbine engine, for example, by reducing efficiency of the gas turbine engine or causing undesirable vibrations that can damage the gas turbine engine.

SUMMARY

According to the present invention, an assembly for use in a gas turbine engine includes an inner diameter (ID) shroud having a plurality of ID slots and an outer diameter (OD) shroud having a plurality of OD slots. The OD shroud is positioned radially outward from the ID shroud. A first stator airfoil extends from the ID shroud to the OD shroud. The first stator airfoil is positioned at least partially in one of the ID slots and is positioned at least partially in one of the OD slots. A first end of the first stator airfoil has one of a raised tab and an indented notch.

Another embodiment of the present invention is a stator airfoil including a leading edge, a trailing edge opposite the leading edge, an inner edge, and an outer edge opposite the inner edge. An airfoil axis is defined as extending from the inner edge toward the outer edge substantially along a middle of the stator airfoil between the leading edge and the trialing edge. The outer edge includes a shoulder and a free portion extending outward from the shoulder. The free portion includes a reference surface and at least one of a raised tab extending outward of the reference surface and an indented notch indented inward of the reference surface.

Another embodiment of the present invention is a method of assembly a stator assembly. The method includes positioning an inner diameter (ID) shroud having first and second ID slots radially inward of an outer diameter (OD) shroud having first and second OD slots, inserting a first stator airfoil through the first ID slot and the first OD slot, and inserting a second stator airfoil through the second ID slot and the second OD slot. The first stator airfoil has a first end edge with a first airfoil edge profile. The second stator airfoil has a second end edge with a second airfoil edge profile different from the first airfoil edge profile. The first end edge is abutted against a first airfoil locator. The second end edge is abutted against a second airfoil locator.

DETAILED DESCRIPTION

Figure 1:
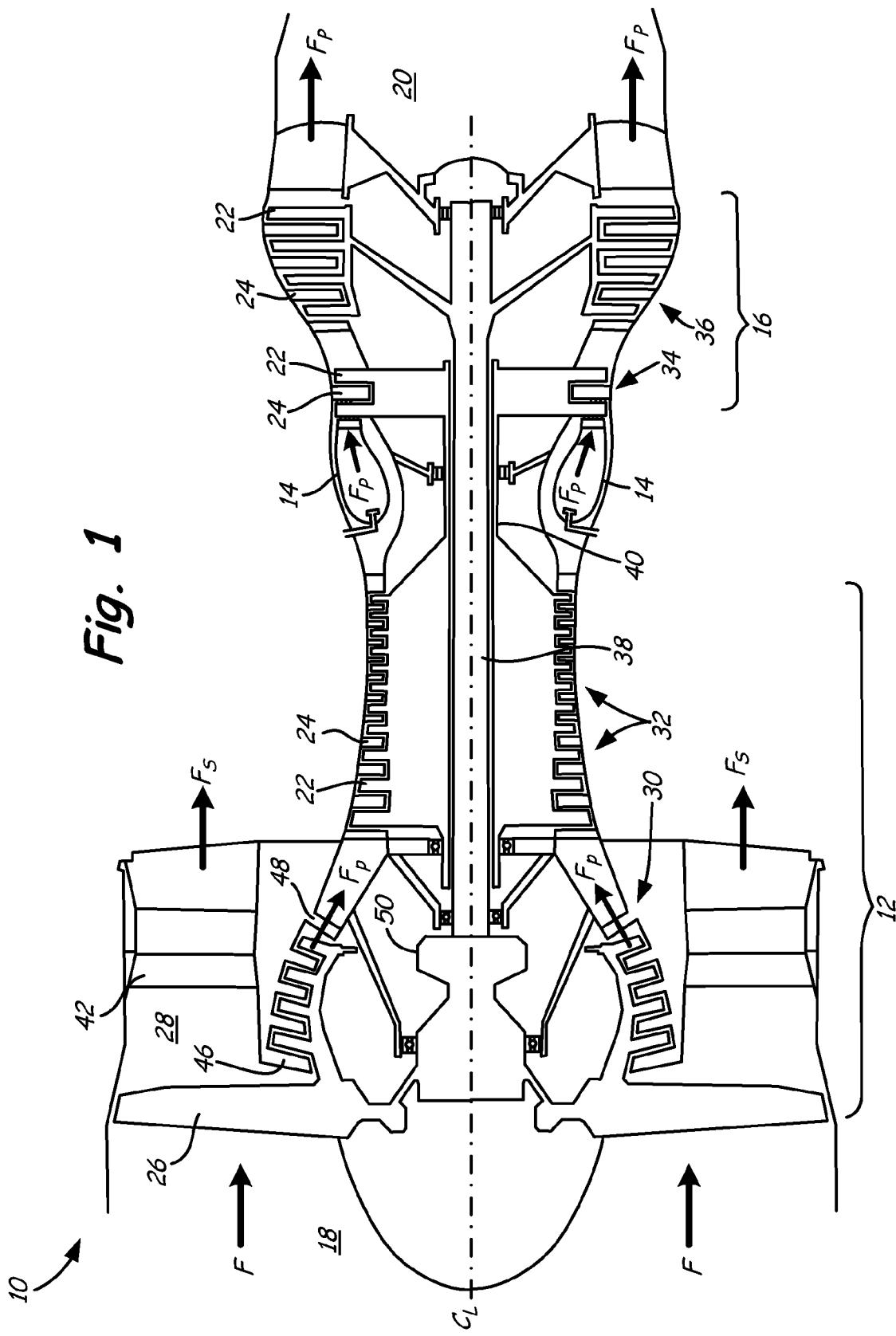
FIG. 1 is a cross-sectional view of a gas turbine engine.

FIG. 1 is a cross-sectional view of gas turbine engine 10. Gas turbine engine 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the embodiment of FIG. 1, gas turbine engine 10 is a turbofan engine with propulsion fan 26 positioned in bypass duct 28, which is coaxially oriented about the engine core along centerline axis (or turbine axis) $C_L$. Alternatively, propulsion fan 26 can be an open-rotor propulsion fan, with turbine engine 10 operating as a turboprop or unducted turbofan engine. Alternatively, propulsion fan 26 and bypass duct 28 may be absent, with turbine engine 10 configured as a turbojet or turboshaft engine, or an industrial gas turbine.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of propulsion fan 26. Propulsion fan 26 accelerates secondary flow $F_S$ through bypass duct 28, with fan exit guide vanes (FEGVs) 42 to reduce swirl and improve thrust performance. In some designs, FEGVs 42 can be structural guide vanes (SGVs), providing combined flow turning and load bearing capabilities.

Flow F passes from propulsion fan 26 to low pressure compressor 30 whereby it becomes primary flow $F_P$. Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance. When passing through low pressure compressor 30, primary flow $F_P$ flows in through fan exit stators (FESs) 46 and out through exit guide vanes (EGVs) 48.

Low pressure shaft 38 and high pressure shaft 40 are mounted coaxially about centerline axis $C_L$, and rotate at different speeds. Propulsion fan 26 can be rotationally coupled to low pressure shaft 38. In one embodiment, propulsion fan 26 can be coupled to low pressure shaft 38 so as to rotate at a common rotational speed with low pressure shaft 38. In alternative embodiments, fan drive gear system 50 can be provided for additional fan speed control, improving thrust performance and efficiency with reduced noise output. Gas turbine engine 10 can thus encompass a wide range of different shaft, spool and turbine engine configurations, including one, two and three-spool turboprop and (high or low bypass) turbofan engines, turboshaft engines, turbojet engines, and multi-spool industrial gas turbines.

Figure 2:
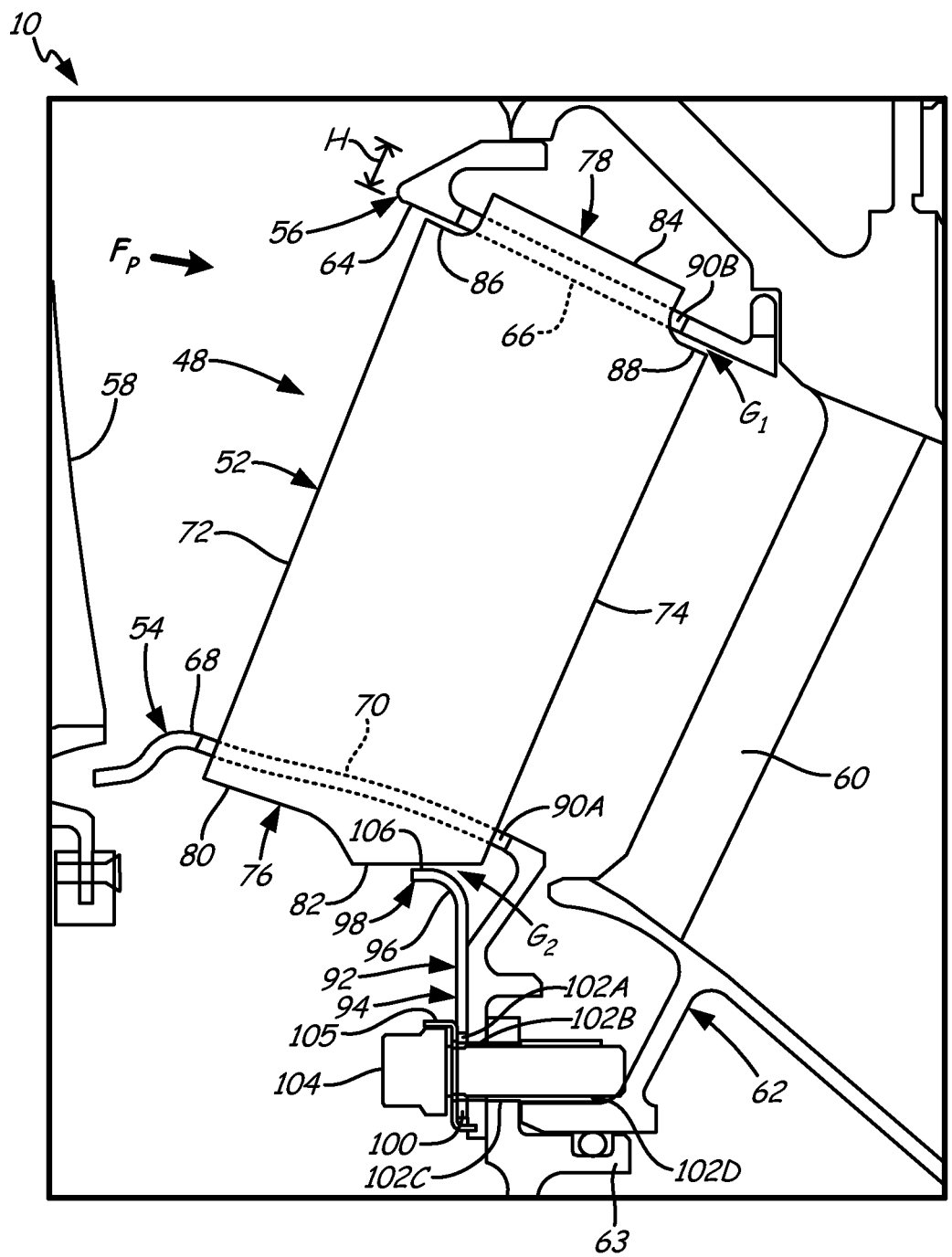
FIG. 2 is a partial side sectional view of an exit guide vane of the gas turbine engine of FIG. 1.

FIG. 2 is a partial side sectional view of EGV 48 of gas turbine engine 10. EGV 48 includes stator airfoil 52 extending from inner diameter (ID) shroud 54 to outer diameter (OD) shroud 56. EGV 48 is positioned downstream of low pressure compressor rotor blade 58 and upstream of strut 60. Strut 60 is one of a plurality of struts that are part of support frame 62. Support frame 62 provides structural support for gas turbine engine 10, including EGV 48. Support frame 62 connects ID shroud 54 and OD shroud 56. In the illustrated embodiment, support frame 62 is an intermediate case that also includes bearing cover 63.

OD shroud 56 includes OD gas path surface 64 and OD slot 66. ID shroud 54 includes ID gas path surface 68 and ID slot 70. Stator airfoil 52 extends from ID shroud 54 to OD shroud 56. Stator airfoil 52 is positioned at least partially in OD slot 66 and at least partially in ID slot 70. Slots 66 and 70 are elongated holes sized to allow insertion of stator airfoil 52. Stator airfoil 52 has leading edge 72, trailing edge 74, radially inner edge 76, and radially outer edge 78.

Radially inner edge 76 is an end of stator airfoil 52 that includes free portion 80 and bumper portion 82. Both free portion 80 and bumper portion 82 are positioned radially inward of ID shroud 54, on an opposite side of primary flow $F_P$. In the illustrated embodiment, free portion 80 is curved and bumper portion 82 is flat. Bumper portion 82 is aligned substantially parallel with centerline axis $C_L$ (shown in FIG. 1).

Radially outer edge 78 is an end of stator airfoil 52 that includes free portion 84 positioned between upstream shoulder 86 and downstream shoulder 88. Free portion 84 is positioned radially outward of OD shroud 56, on an opposite side of primary flow $F_P$, while shoulders 86 and 88 are positioned radially inward of OD shroud 56. Shoulders 86 and 88 overhang past OD slot 66 such that shoulders 86 and 88 would contact or bump against OD gas path surface 64 of OD shroud 56 if stator airfoil 52 were to move radially outward. Thus, the overhang of shoulders 86 and 88 can prevent stator airfoil 52 from sliding radially outward through OD slot 66. In the illustrated embodiment, free portion 84, shoulder 86, and shoulder 88 are substantially straight, with curved fillets connecting free portion 84 to shoulders 86 and 88. Free portion 84, shoulder 86, and shoulder 88 are angled with respect to centerline axis $C_L$. Shoulders 86 and 88 are spaced from OD gas path surface 64 by gap $G_1$. Free portion 84 is spaced from OD gas path surface 64 by height H. Thus, free portion 84 extends above shoulders 86 and 88 by a distance of $G_1+H$.

Stator airfoil 52 is attached to ID shroud 54 via potting material 90A, positioned in ID slot 70 between stator airfoil 52 and ID stator 54. Stator airfoil 52 is attached to OD shroud 56 via potting material 90B, positioned in OD slot 66 between stator airfoil 52 and OD shroud 56. In one embodiment, potting material 90A and 90B can be silicone rubber, or another suitable resilient material. Potting material 90A and 90B can be applied to ID slot 70 and OD slot 66 as a liquid and then allowed to solidify. Potting material 90A and 90B can hold stator airfoil 52 so as to be spaced from and avoid contact with ID shroud 54, OD shroud 56, and bumper 92. This spacing can reduce transmission of undesirable vibrations between stator airfoil 52 and ID shroud 54, OD shroud 56, and bumper 92. In the illustrated embodiment, stator airfoil 52 is in physical contact with no part of gas turbine engine 10 except for potting material 90A and 90B.

Bumper 92 is proximate radially inner edge 76. Bumper 92 is proximate and spaced from bumper portion 82 by gap $G_2$. In the illustrated embodiment, bumper 92 is a bumper ring that includes radially aligned portion 94, bend 96, and axially aligned portion 98. Radially aligned portion 94 is substantially aligned in a radial direction, extending radially outward from centerline axis $C_L$ (shown in FIG. 1). Radially aligned portion 94 includes flange 100 and bolt hole 102A passing through flange 100. Bolt holes 102B, 102C, and 102D pass through ID shroud 54, bearing cover 63, and intermediate case 62, respectively. Bolt 104 extends through bolt holes 102A-102D to connect bumper 92, ID shroud 54, bearing cover 63, and intermediate case 62. Cup washer 105 holds and restricts rotation of bolt 104.

Axially aligned portion 98 of bumper 92 is substantially aligned in an axial direction. Thus, axially aligned portion 98 is parallel to centerline axis $C_L$. Axially aligned portion 98 includes bumper surface 106, spaced from bumper portion 82 of stator airfoil 52 by gap $G_2$. Bumper surface 106 is also substantially axially aligned and substantially parallel with bumper portion 82. Bumper surface 106 is the radially outer most surface of axially aligned portion 98 and of bumper 92.

During assembly of EVG 48, stator airfoil 52 is inserted through ID shroud 54 and OD shroud 56 in a direction from radially inward to radially outward. Radially outer edge 78 of stator airfoil 52 first passes through ID slot 70 and then passes through OD slot 66, such that free portion 84 extends radially outward of OD shroud 56, while shoulders 86 and 88 remain radially inward from OD shroud 56 as illustrated. Radially inner edge 76 of stator airfoil 52 remains radially inward from ID shroud 54. Potting material 90A and 90B is then applied to ID slot 70 and OD slot 66 and allowed to solidify. A similar procedure is repeated with other stator airfoils (not shown) positioned circumferentially around EVG 48 to connect those stator airfoils to ID shroud 54 and OD shroud 56.

Bumper 92 is then positioned radially inward of stator airfoil 52 (and the other stator airfoils of EGV 48) and attached via bolt 104. Bolt 104 is one of a plurality of bolts that attach bumper 92. Bumper 92 is positioned radially inward but spaced from stator airfoil 52.

During normal operation, bumper 92 is not necessary to hold stator airfoil 52 in place. Stator airfoil 52 can be held in place exclusively by potting material 90A and 90B, as described above. Potting material 90A and 90B can be rigid enough to hold stator airfoil 52 in place while being resilient enough to reduce undesirable stress and fatigue damage to stator airfoil 52. Potting material 90A and 90B can be formulated and configured to avoid failure during operating conditions expected in EGV 48.

However, should potting material 90A and 90B fail during operation of gas turbine engine 10 (and if bumper 92 were omitted), stator airfoil 52 could come loose, slide radially inward, and cause catastrophic damage to gas turbine engine 10. For example, should stator airfoil 52 slide radially inward far enough to allow radially outer edge 78 of stator airfoil 52 to fall out of OD slot 66, stator airfoil 52 could fall axially rearward and damage downstream components, such as high pressure compressor 32 (shown in FIG. 1). Thus, bumper 92 can be provided to prevent stator airfoil 52 from sliding a substantial distance should potting material 90A and 90B fail. Gap $G_2$ can be smaller than height H. Thus, if stator airfoil 52 slides so that bumper portion 82 contacts bumper surface 106 of bumper 92, gap $G_2$ can be reduced to zero and height H can remain a positive non-zero distance such that free portion 84 remains radially outward of gas path surface 64 of OD shroud 56. Thus, stator airfoil 52 can be safely retained in ID slot 70 and OD slot 66 until EGV 48 is repaired.

Bumper 92 can be made of sheet metal having a relatively thin thickness, allowing bumper 92 to be relatively light. Bumper 92 can be made of sheet metal having a substantially uniform thickness. Bumper 92 can be made of stainless steel, titanium, or another metal or non-metal material suitable for the application. Stator airfoil 52 can be made of aluminum, or another metal or non-metal suitable for the application. In embodiments where bumper 92 is made of metal (such as stainless steel) that is harder than the metal (such as aluminum) of stator airfoil 52, bumper 92 can include bend 96 and axially aligned portion 98. This allows bumper surface 106 to be relatively wide to distribute force between bumper 92 and stator airfoil 52 should they come in contact during a failure of potting material 90A and 90B. Having a relatively wide bumper surface 106 can be beneficial in applications where stator airfoil 52 is made of aluminum. In other applications where stator airfoil 52 is made of a harder material, axially aligned portion 98 can be reduced or eliminated.

Figure 3:
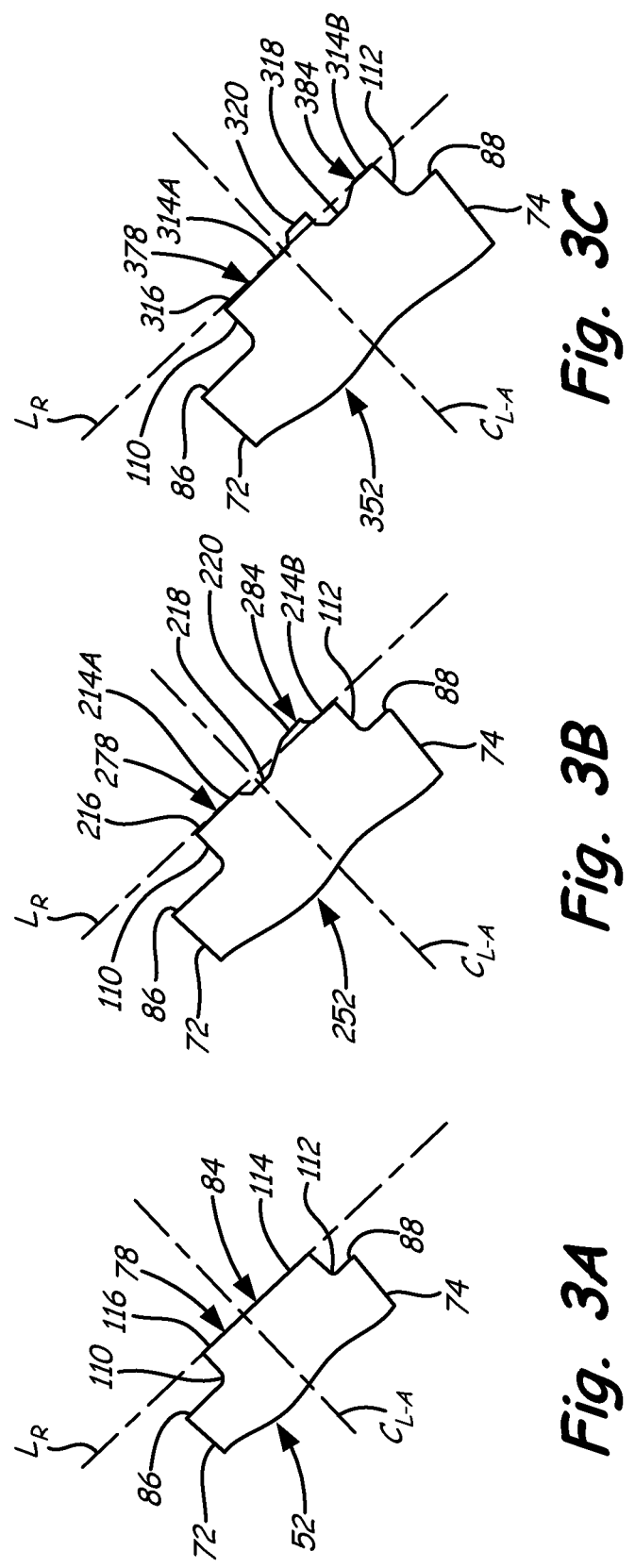
FIG. 3A is a partial side view of a stator airfoil shown in FIG. 2.
FIG. 3B is a partial side view of a stator airfoil having an alternate airfoil edge profile.
FIG. 3C is a partial side view of a stator airfoil having another alternate airfoil edge profile.

FIG. 3A is a partial side view of stator airfoil 52. FIG. 3A shows radially outer edge 78, including upstream shoulder 86, filleted side 110, free portion 84, filleted side 112, and downstream shoulder 88. Free portion 84 has a substantially straight reference surface 114 between filleted side 110 and filleted side 112. Radially outer edge 78 has airfoil edge profile 116, which extends along upstream shoulder 86, filleted side 110, reference surface 114, filleted side 112, and downstream shoulder 88. Reference line $L_R$ extends along reference surface 114. Airfoil centerline axis $C_{L-A}$ extends from radially inner edge 76 (shown in FIG. 2) to radially outer edge 78 and extend substantially along a middle of stator airfoil 52 between leading edge 72 and trailing edge 74. Reference surface 114 is outward of upstream shoulder 86 and downstream shoulder 88 with respect to airfoil centerline axis $C_{L-A}$.

FIG. 3B is a partial side view of stator airfoil 252, having airfoil edge profile 216. Airfoil edge profile 216 differs from airfoil edge profile 116 (shown in FIG. 3A) because radially outer edge 278 of stator airfoil 252 includes reference surfaces 214A and 214B separated by indented notch 218 and raised tab 220. Indented notch 218 is indented inward of reference surfaces 214A and 214B, and thus is inward of reference line $L_R$. Indented notch 218 is outward of both upstream shoulder 86 and downstream shoulder 88. Reference surfaces 214A and 214B are outward of indented notch 218. Raised tab 220 extends outward of reference surfaces 214A and 214B, and thus is outward of reference line $L_R$. Leading edge 72 is nearer indented notch 218 than raised tab 220.

FIG. 3C is a partial side view of stator airfoil 352, having airfoil edge profile 316. Airfoil edge profile 316 differs from airfoil edge profile 116 (shown in FIG. 3A) and airfoil edge profile 216 (shown in FIG. 3B) because radially outer edge 378 of stator airfoil 352 includes references surfaces 314A and 314B separated by indented notch 318 and raised tab 320. Indented notch 318 is indented inward of reference surfaces 314A and 314B, and thus is inward of reference line $L_R$. Indented notch 318 is outward of both upstream shoulder 86 and downstream shoulder 88. Reference surfaces 314A and 314B are outward of indented notch 318. Raised tab 320 extends outward of reference surfaces 314A and 314B, and thus is outward of reference line $L_R$. Leading edge 72 is nearer raised tab 320 than indented notch 318.

Thus, stator airfoil 352 has indented notch 318 at a different location than the location of indented notch 218 on stator airfoil 252 (shown in FIG. 3B). Also, stator airfoil 352 has raised tab 320 at a different location than the location of raised tab 220 on stator airfoil 252. In the illustrated embodiment, stator airfoil 352 has raised tab 320 at approximately the same location as the location of indented notch 218 on stator airfoil 252. Also, stator airfoil 352 has indented notch 318 at approximately the same location as the location of raised tab 220 on stator airfoil 252. In alternative embodiments, stator airfoils 52, 252, and 352 can have more or fewer indented notches than those illustrated. In further alternative embodiments, stator airfoils 52, 252, and 352 can have more or fewer raised tabs than those illustrated.

Stator airfoils 52, 252, and 352 can have different airfoil profiles along leading edge 72, along trailing edge 74, and between leading edge 72 and trailing edge 74. In the illustrated embodiment, the differences in airfoil profiles of stator airfoils 52, 252, and 352 is not visually apparent. However, the difference in airfoil edge profiles 116, 216, and 316 is visually apparent. Thus, airfoil edge profiles 116, 216, and 316 can provide a visual indication to an installer, allowing the installer to differentiate between stator airfoils 52, 252, and 352. Moreover, the differences between airfoil edge profiles 116, 216, and 316 can provide a mechanical mistake proofing function when assembled in a stator assembly fixture such as stator assembly fixture 400 shown in FIGS. 4-6.

Figure 4:
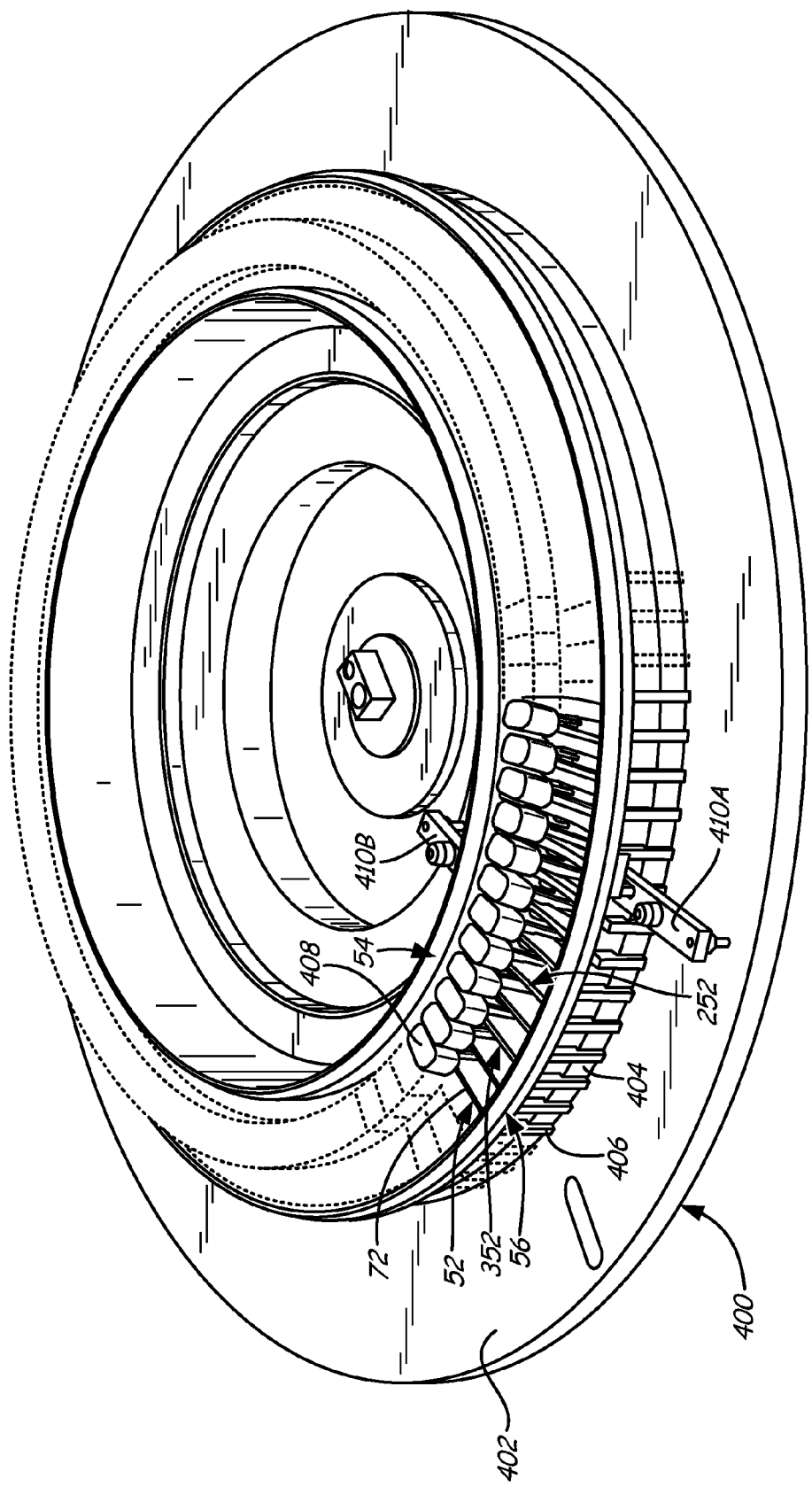
FIG. 4 is a perspective view of a stator assembly fixture.

FIG. 4 is a perspective view of stator assembly fixture 400. Stator assembly fixture 400 includes base 402, ring 404, airfoil locators 406, airfoil locators 408, and clamps 410A and 410B. Base 402 is a substantially annular base plate and ring 404 is a substantially annular ring rigidly attached to base 402. A plurality of airfoil locators 406 are rigidly attached to ring 404.

Stator assembly fixture 400 holds stator airfoils 52, 252, and 352, OD shroud 56, and ID shroud 54 in place for assembly. Airfoil locators 406 and 408 provide points of location for properly positioning and aligning stator airfoils 52, 252, and 352 during assembly. Clamps 410A and 410B hold portions of stator assembly fixture 400 in place during assembly. For example, clamp 410A clamps on one of airfoil locators 406 to hold ring 404 and airfoil locators 406 in place. A plurality of airfoil locators 406 are positioned around an entire circumference of ring 404, with one airfoil locator 406 corresponding to each one of stator airfoils 52, 252, and 352.

Figure 5:
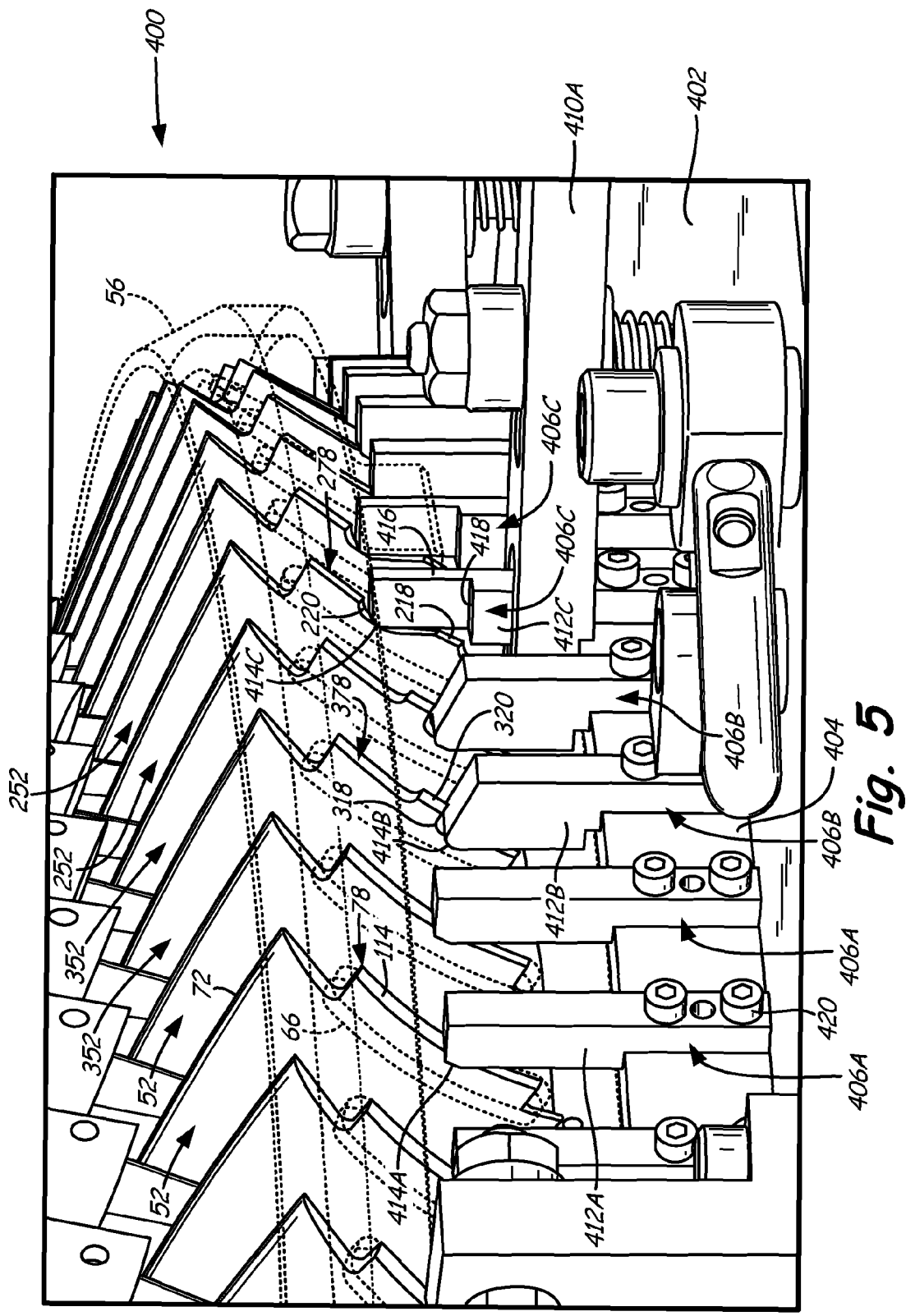
FIG. 5 is a partial perspective view of the stator assembly fixture of FIG. 4.

FIG. 5 is a partial perspective view of stator assembly fixture 400, showing airfoil locators 406 in greater detail. Airfoil locators 406 include airfoil locators 406A, 406B, and 406C, which have three different locator shapes. Airfoil locator 406A includes a relatively tall and narrow body 412A with a chamfered locator surface 414A at a top end of body 412A. Airfoil locator 406B includes a relatively short and wide body 412B, with a curved locator surface 414B at a top end of body 412B. Airfoil locator 406C includes a relatively tall and narrow body 412C, with a curved locator surface 414C at a top end of body 412C. Body 412C includes projection 416 extending from platform 418 toward the top end of body 412C. Airfoil locator 406C is taller than both airfoil locator 406A and airfoil locator 406B. A plurality of bolts 420 attach airfoil locators 406A, 406B, and 406C to ring 404.

EGV 48 (shown in FIG. 2) is assembled by first positioning ID shroud 54 (shown in FIGS. 2 and 4) and OD shroud 56 in stator assembly fixture 400. ID shroud is positioned radially inward of OD shroud. Stator airfoils 52, 252, and 352 are inserted first through ID slot 70 (shown in FIG. 2) and then through OD slot 66.

Radially outer edge 78 of stator airfoil 52 is abutted against locator surface 414A of airfoil locator 406A. Locator surface 414A is in contact with reference surface 114. Radially outer edge 378 of stator airfoil 352 is abutted against locator surface 414B of airfoil locator 406B. Locator surface 414B is in contact with indented notch 318. Radially outer edge 278 of stator airfoil 252 is abutted against locator surface 414C of airfoil locator 406C. Locator surface 414C is in contact with indented notch 218.

After stator airfoils 52, 252, and 352 are positioned in their respective ID slots 70 and OD slots 66 in abutting contact against airfoil locators 406A, 406B, and 406C, liquid potting material 90A and 90B (shown in FIG. 2) is applied to each of ID slots 70 and OD slots 66. Potting material 90A and 90B is then solidified to hold stator airfoils 52, 252, and 352 in place. EGV 48 can then be removed from stator assembly fixture 400 and installed in gas turbine engine 10 (shown in FIG. 1).

Stator airfoils 52, 252, and 352 can be installed in particular locations around EGV 48 as appropriate for a particular application. If stator airfoils 52, 252, and 352 are all installed in the correct locations, then there will be enough space for bumper 92 (shown in FIG. 2) to be installed adjacent radially inner edges 76 of stator airfoils 52, 252, and 352.

The locations of installation of stator airfoils 52, 252, and 352 can be selected to improve performance of gas turbine engine 10. For example, stator airfoils 52, 252, and 352 can be positioned with respect to strut 60 so as to reduce backpressure blockage pulses from strut 60. If, however, one or more of stator airfoils 52, 252, and 352 were installed in the wrong location, backpressure blockage pulses from strut 60 could be undesirably increased.

Airfoil edge profiles 116, 216, and 316 (shown in FIGS. 3A-3C) of stator airfoils 52, 252, and 352 can prevent stator airfoils 52, 252, and 352 from being installed in the wrong locations. For example, if stator airfoil 252 were installed with abutting contact against airfoil locator 406A, then raised tab 220 would be in abutting contact with airfoil locator 406A. This would prevent stator airfoil 252 from being fully inserted, and thus prevent installation of bumper 92. If an installer attempted to install bumper 92 but could not do so because installation was blocked by radially inner edge 76 of stator airfoil 252, the installer would then know that stator airfoil 252 is installed in the wrong location.

Similarly, if stator airfoil 252 were installed with abutting contact against airfoil locator 406B, then raised tab 220 would be in abutting contact with airfoil locator 406B, preventing stator airfoil 252 from being fully installed. If stator airfoil 352 were installed with abutting contact against either of airfoil locators 406A or 406C, then raised tab 320 would be in abutting contact with one of airfoil locators 406A or 406C, preventing stator airfoil 352 from being fully installed. If stator airfoil 52 were installed with abutting contact against either of airfoil locators 406B or 406C, then reference surface 114 would be in abutting contact with one of airfoil locators 406B or 406C, preventing stator airfoil 52 from being fully installed. Thus, stator airfoils 52, 252, and 352 combine with stator assembly fixture 400 to provide a mechanical mistake proofing function for the assembly of EVG 48, or another type of stator assembly (such as FES 46, shown in FIG. 1). In the illustrated embodiment, each stator airfoil 52, 252, and 352 can be installed in one of multiple proper locations, but not all locations. In alternative embodiments, each stator airfoil 52, 252, and 352 could be configured to be properly inserted in only a single proper location.

Figure 6:
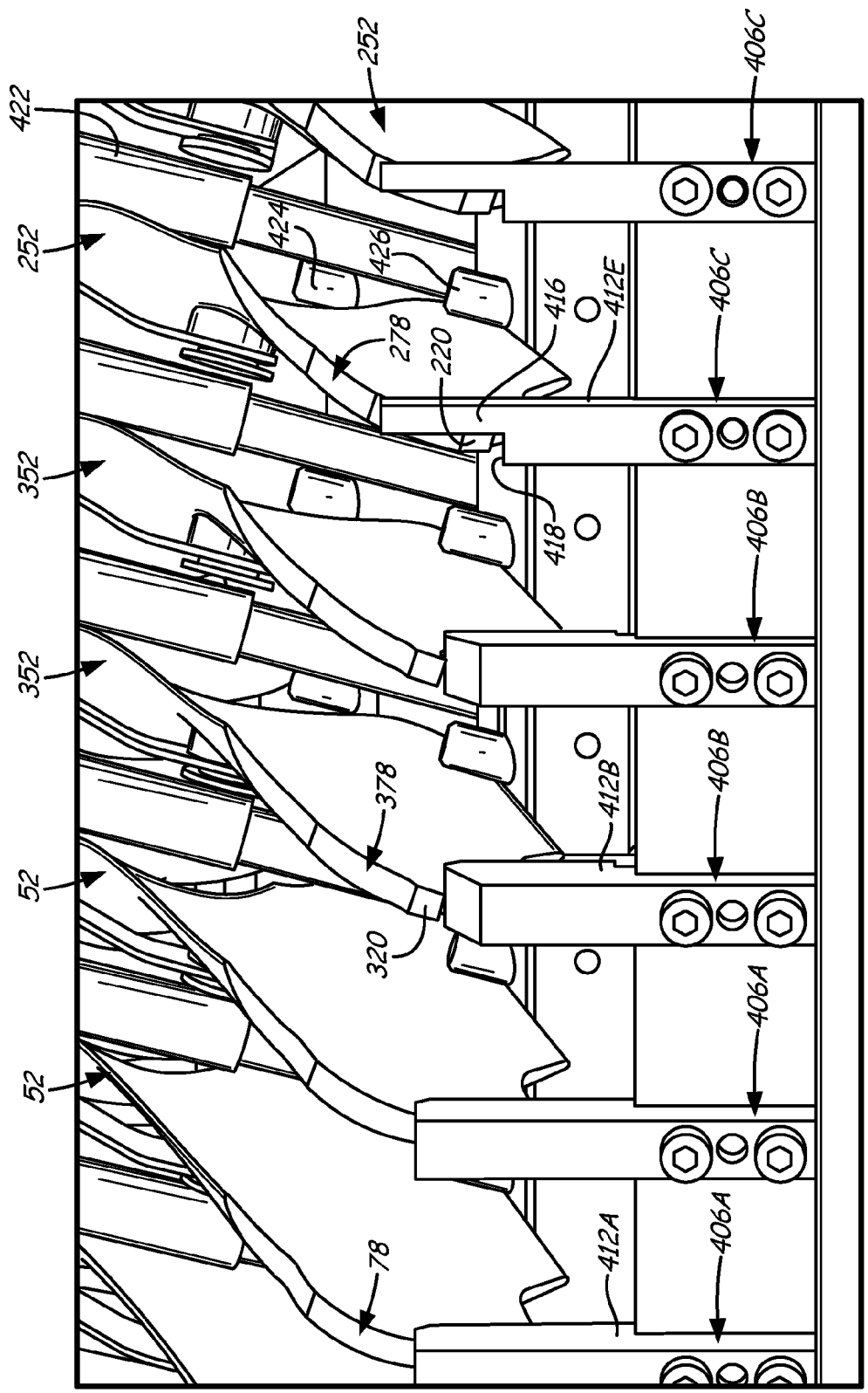
FIG. 6 is another partial perspective view of the stator assembly fixture of FIG. 4, shown with an outer diameter (OD) shroud removed.

FIG. 6 is another partial perspective view of stator assembly fixture 400. In FIG. 6, OD shroud 56 has been removed for clarity. Stator assembly fixture 400 includes airfoil locators 422, 424, and 426 which, along with airfoil locators 406A-C, can provide points of location for proper positioning and aligning of stator airfoils 52, 252, and 352. In the illustrated embodiment, six different airfoil locators (not all shown) can be used to properly position each stator airfoil 52, 252, and 352 during assembly.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, airfoil locators 406A-406C and stator airfoils 52, 252, and 352 need not be shaped precisely as illustrated, but can have different shapes as suitable for the application. Moreover, stator assembly fixture 400 can be constructed differently than in the illustrated embodiment, so long as it includes airfoil locators suitable for positioning stator airfoils having different airfoil edge profiles.

The invention claimed is:

1. An assembly for use in a gas turbine engine, the assembly comprising:
   an inner diameter (ID) shroud having a plurality of ID slots;
   an outer diameter (OD) shroud having a plurality of OD slots and positioned radially outward from the ID shroud; and
   a first stator airfoil extending from the ID shroud to the OD shroud, wherein the first stator airfoil has a leading edge and a trailing edge and is positioned at least partially in one of the ID slots and is positioned at least partially in one of the OD slots, and wherein a first radially outer end of the first stator airfoil includes:
   a shoulder; and
   a free portion extending outward from the shoulder and having a leading end and a trailing end, wherein the free portion comprises:
   a reference surface; and
   at least one of:
   a raised tab extending outward of the reference surface having a leading tab surface facing the leading end and a trailing tab surface facing the trailing end between the leading end and the trailing end of the free portion; and
   an indented notch indented inward of the reference surface having a leading notch surface facing the trailing end and a trailing notch surface facing the leading end between the leading end and the trailing end of the free portion.

2. The assembly of claim 1, wherein the first radially outer end has both the raised tab and the indented notch.

3. The assembly of claim 1, and further comprising:
a second stator airfoil extending from the ID shroud to the OD shroud, wherein the second stator airfoil is positioned at least partially in one of the ID slots and is positioned at least partially in one of the OD slots, and wherein a second radially outer end of the second stator airfoil has one of a raised tab and an indented notch.

4. The assembly of claim 3, wherein the first radially outer end is a first radially outer edge of the first stator airfoil, wherein the second radially outer end is a second radially outer edge of the second airfoil, and wherein the first radially outer edge has a first profile different than a second profile of the second radially outer edge.

5. The assembly of claim 3, wherein the first radially outer end and the second radially outer end both have the raised tab and the indented notch.

6. The assembly of claim 3, wherein the first radially outer end has the raised tab and the second radially outer end has the indented notch.

7. The assembly of claim 3, and further comprising:
a third stator airfoil extending from the ID shroud to the OD shroud, wherein the third stator airfoil is positioned at least partially in one of the ID slots and is positioned at least partially in one of the OD slots, and wherein a third end of the third stator airfoil has a substantially straight free portion positioned radially outward of the OD slot.

8. The assembly of claim 1, wherein the first stator airfoil is connected to the ID shroud via a first potting material and to the OD shroud via a second potting material.

9. The assembly of claim 8, wherein the first and second potting materials hold the first stator airfoil to be spaced from and avoid contact with the ID shroud and the OD shroud.

10. A stator airfoil comprising:
a leading edge;
a trailing edge opposite the leading edge;
a radially inner edge; and
a radially outer edge opposite the radially inner edge, wherein an airfoil axis is defined as extending from the radially inner edge toward the radially outer edge substantially along a middle of the stator airfoil between the leading edge and the trialing edge, wherein the radially outer edge comprises:
a shoulder; and
a free portion extending outward from the shoulder and having a leading end and a trailing end, wherein the free portion comprises:
a reference surface; and
at least one of:
a raised tab extending outward of the reference surface having a leading tab surface facing the leading end and a trailing edge tab surface facing the trailing end between the leading end and the trailing end of the free portion; and
an indented notch indented inward of the reference surface having a leading notch surface facing the trailing end and a trailing notch surface facing the leading end between the leading end and the trailing end of the free portion.

11. The stator airfoil of claim 10, wherein the free portion on the radially outer edge comprises both the raised tab and the indented notch.

12. The stator airfoil of claim 11, wherein the leading edge is nearer the raised tab than the indented notch.

13. The stator airfoil of claim 11, wherein the leading edge is nearer the indented notch than the raised tab.

14. The stator airfoil of claim 11, wherein the indented notch is outward of the shoulder, wherein the reference surface is outward of the indented notch, and wherein the raised tab is outward of the reference surface.

15. The stator airfoil of claim 10, wherein the shoulder is an upstream shoulder nearest the leading edge, and further comprising:
a downstream shoulder nearest the trailing edge, wherein the free portion is defined between upstream shoulder and the downstream shoulder.

16. A method of assembling a stator assembly, the method comprising:
positioning an inner diameter (ID) shroud having first and second ID slots radially inward of an outer diameter (OD) shroud having first and second OD slots;
inserting a first stator airfoil through the first ID slot and then the first OD slot, wherein the first stator airfoil has a first end edge with a first airfoil edge profile;
inserting a second stator airfoil through the second ID slot and then the second OD slot, wherein the second stator airfoil has a second end edge with a second airfoil edge profile different from the first airfoil edge profile;
abutting the first end edge against a first airfoil locator; and
abutting the second end edge against a second airfoil locator.

17. The method of claim 16, and further comprising:
applying liquid potting material to each of the first and second ID slots and the first and second OD slots; and
solidifying the liquid potting material so as to hold the first and second stator airfoils in the first and second ID slots and the first and second OD slots.

18. The method of claim 16, wherein the first and second airfoil locators are connected to a base of an assembly fixture.

19. The method of claim 16, wherein the first airfoil locator has a first locator shape, wherein the second airfoil locator has a second locator shape that is different than the first locator shape.

20. The method of claim 16, wherein the first stator airfoil is inserted through the first ID slot before being inserted through the first OD slot, wherein the second stator airfoil is inserted through the second ID slot before being inserted through the second OD slot, and wherein the first and second end edges are radially outer edges of the first and second stator airfoils, respectively.

* * * * *